3,035,077
PREPARATION OF DIOLS
Herbert L. Johnson, Media, and Gert G. Eberhardt, Philadelphia, Pa., assignors to Sun Oil Company, Philadelphia, Pa., a corporation of New Jersey
No Drawing. Filed Mar. 31, 1960, Ser. No. 18,829
10 Claims. (Cl. 260—448)

The present invention relates to the preparation of diols and more particularly to the preparation of straight chain alpha-omega diols having at least 6 carbon atoms per molecule utilizing 1,3-butadiene as a starting material.

Straight chain diols having a hydroxy group attached at each terminal carbon atom are useful in the preparation of polyurethane resins and polyesters. According to the invention diols of this type are prepared by either of two embodiments involving the hereinafter described series of steps.

In the first embodiment the steps involved are as follows:

(1) 1,3-butadiene is reacted in a dry inert liquid reaction medium under pressure at a temperature in the range of 80–150° C. with one or more aluminum alkyl compounds having either of the following formulas:

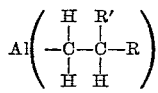

or

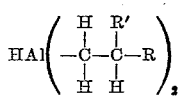

wherein R is an alkyl group having 1–5 carbon atoms and R' is a hydrocarbon group having 1–7 carbon atoms including alkyl, cycloalkyl, phenyl and benzyl groups. Examples of suitable aluminum alkyl compounds are triisobutyl aluminum, tri-2-methyl butyl aluminum, tri-2-phenyl propyl aluminum, tri-2-phenyl butyl aluminum, tri-2-benzyl propyl aluminum, tri-2-cyclohexyl propyl aluminum, diisobutyl aluminum hydride, di-2-methyl butyl aluminum hydride, di-2-phenyl propyl aluminum hydride, di-2-benzyl propyl aluminum hydride and di-2-cyclohexyl propyl aluminum hydride. Diisobutyl aluminum hydride is the preferred reactant. The result of this reaction is to form an organo-aluminum compound in which the butenyl groups have the double bond at the omega position and to release an isoolefin corresponding to the alkyl groups displaced from the aluminum alkyl compound. For example, if diisobutyl aluminum hydride is the reactant used, isobutylene is released in the reaction. In this step the molar ratio of butadiene to the organo-aluminum compound employed should be in excess of 3 to 1 and preferably at least 4 to 1. As the inert reaction medium, various hydrocarbons such as heptane, octane, decane, toluene, xylenes, cumene and the like can be used. After the reaction has taken place the olefin formed and any excess butadiene are vented from the system. If desired the system can be repressured with butadiene and maintained at 80–150° C. for an additional period to insure completion of the reaction and again vented.

(2) The next step of the first embodiment involves the reaction of the product from the first step dissolved in the reaction medium with one or more of the above-described aluminum alkyl compounds. Diisobutyl aluminum hydride again is the preferred reactant. The amount of the aluminum compound employed in this case should be such that the molar ratio of it to the aluminum compound employed initially is in the range of 0.8–1.2. Preferably an approximately equal molar ratio is used. The reaction is conducted by maintaining the mixture at a temperature of 80–150° C. while venting the system. Under these conditions isoalkyl groups are displaced from the aluminum alkyl compound thus releasing the corresponding isoolefin and each of the butenyl chains attaches at the omega carbon to an aluminum atom, thus taking the place of the isoalkyl radical. The isoolefin is removed from the system by venting using reduced pressure if necessary. This results in crosslinking and formation of a polymeric organo-aluminum material in which the tetramethylene chains are attached at each end to aluminum atoms. The material remains in solution in the reaction medium.

(3) The organo-aluminum compound containing in excess of 80% of the available valences of aluminum attached to alpha-omega tetramethylene groups in the inert reaction medium is reacted with ethylene in the temperature range of 60–160° C. This causes the ethylene groups to be inserted between the aluminum atom and the tetramethylene group and thus increases the length of the carbon chain. The amount of ethylene reacted should be sufficient to cause the chain to grow to a length of at least six carbon atoms; or in other words the amount of ethylene employed should be at least three moles per mole of aluminum present. The amount of ethylene in excess of this proportion that will be used will depend upon the chain length desired for the diol product. For example, if it is desired to produce diols having an average chain length of 16 carbon atoms, the reaction should be continued until 18 moles of ethylene have been consumed per mole of triisobutyl aluminum charged in the first two steps. The resulting chains will have a statistically varying number of carbon atoms ranging, for example, from 12 to 20. After the desired amount of ethylene units have been incorporated in the organo-aluminum compound, the system is vented to remove any excess ethylene.

(4) The reaction mixture is then contacted at a temperature in the range of 0–150° C., more preferably 30–60° C., with oxygen to insert an oxygen atom between each aluminum atom and the polymethylene groups attached thereto. This can be done by passing dry air or a nitrogen-oxygen mixture into the reaction mixture. Since the reaction is exothermic, it is desirable in some cases to use a low concentration of oxygen at the beginning of the reaction and thereafter increase the oxygen concentration in the gas stream as the rate of reaction decreases. Near the end pure oxygen can be used to insure completion of the reaction.

(5) After the oxygenation step water or a dilute acid is added to the mixture to convert the organo-aluminum material into the desired diols. Water is preferred as it readily hydrolyzes the material especially at elevated temperature and forms the diols and aluminum hydroxide. The latter can be separated from the reaction mixture by filtration and the water can be removed by settling, centrifuging or distillation. The reaction medium finally is distilled from the mixture, leaving the alpha-omega diols as residue. Alternatively, the organo-aluminum material can be hydrolyzed by means of an aqueous alcohol solution containing, for example, 70–90% alcohol, in which case the mixture after filtration can be separated into a hydrocarbon reaction medium layer and an alcohol layer which contains substantially all of the diols. The alcohol layer can be distilled to obtain the diols as residue.

The following example illustrates the above-described embodiment of the invention more specifically:

*Example I*

Diisobutyl aluminum hydride is first prepared from triisobutyl aluminum in the following manner. 99 grams (0.5 mole) of triisobutyl aluminum in 500 ml. of decane are placed in a one gallon glass-lined autoclave which has been carefully cleaned and blanketed with dry nitrogen. The solution is heated to 130–140° C. and the isobutylene released is vented. When the triisobutyl aluminum has been converted to diisobutyl aluminum hydride, the evolution of isobutylene stops. The reactor is cooled to room temperature and flushed with dry nitrogen. 216 grams (4 moles) of 1,3-butadiene are added and the reactor is heated to 90–100° C. for a period of 4 hours, then cooled to room temperature and the isobutylene formed together with excess butadiene is vented from the system. An analysis of the reaction mixture at this stage shows that most of the diisobutyl aluminum hydride has reacted with the butadiene to yield an organo-aluminum reaction product containing a substantial amount of tributenyl aluminum. The analysis is carried out by decomposing a small amount of the reaction product with ethylene glycol and determining the ratio of butadiene to isobutylene by mass spectrometric analysis.

To the reaction mixture described above are added 99 grams (0.5 mole) of triisobutyl aluminum. The autoclave is heated to 130–150° C. and isobutylene released in the reaction is vented. The temperature is maintained in the range of 130–150° C. until no further release of isobutylene occurs. A polymeric material in which each tetramethylene chain is attached to two aluminum atoms in the terminal positions is formed and remains in solution in the decane.

Lengthening the tetramethylene groups is next accomplished by pressuring the autoclave with ethylene to about 1000 p.s.i.g. and heating the reactor to 80–130° C. with stirring. The pressure increases until a temperature of 80–90° C. is reached and then begins to drop. Sufficient ethylene is added over a period of 2 hours to lengthen the carbon chains to 8–16 carbon atoms. The reactor is then flushed with nitrogen to remove any unreacted ethylene.

The temperature of the reaction mixture is then lowered to 30–60° C. and dry air is passed into the mixture, causing an exothermic reaction. Rate of addition of the air is regulated so that the temperature does not exceed 60° C. After no further reaction with oxygen occurs, water is added and the mixture is heated to nearly 100° C. to effect hydrolysis. The aluminum hydroxide which forms coagulates as a precipitate and is removed by filtration after the hydrolysis has been completed. The filtrate is then distilled to remove water and decane and about 135 grams of residue are obtained. This residue is composed of mixed alpha-omega diols mainly having 8–16 carbon atoms per molecule.

In the second embodiment of the invention the series of steps are as follows:

(1) The first step is the same as described for the first embodiment.

(2) The next step involves reacting the organo-aluminum compound containing tributenyl aluminum in the inert reaction medium with ethylene at a temperature in the range of 60–160° C. This causes ethylene groups to attach between the aluminum atoms and the butenyl chains and increases the length of the alkenyl chains. The amount of ethylene reacted should be sufficient to cause the chains to grow to a length of at least six carbon atoms; or in other words the amount of ethylene employed should be in excess of three moles per mole of tributenyl aluminum. The amount of ethylene in excess of this proportion that will be employed will depend upon the chain length desired for the diol product. For example, if it is desired to produce diols having an average chain length of 16 carbon atoms, the reaction should be continued until 18 moles of ethylene have been consumed per mole of tributenyl aluminum. The resulting chains will have a statistically varying number of carbon atoms ranging, for example, from 12 to 20. After the desired amount of ethylene units have been incorporated in the trialkenyl aluminum, the system is vented to remove any excess ethylene.

(3) The trialkenyl aluminum dissolved in the reaction medium is then reacted with an aluminum alkyl of the types previously defined, the molar ratio of aluminum alkyl to the aluminum alkyl initially used being in the range of 0.8–1.2 and more preferably about 1:1. This reaction is conducted by adding the aluminum alkyl to the reaction medium and maintaining the mixture at a temperature of 80–150° C. while venting the system using reduced pressure if necessary to remove the displaced olefin. Considering diisobutyl aluminum hydride as the aluminum compound employed, under the reaction conditions isobutyl groups are displaced from the diisobutyl aluminum hydride and each of the alkenyl chains attaches at its free end to an aluminum atom, thus taking the place of an isobutyl radical. Isobutylene is released and is vented from the system. This results in crosslinking and formation of a polymeric organo-aluminum material in which polymethylene chains are attached at each end to aluminum atoms. The material remains in solution in the reaction medium.

(4) This step is the same as step 4 in the first described embodiment.

(5) This step likewise is the same as step 5 in the first embodiment.

The following example illustrates the second embodiment of the invention more specifically:

*Example II*

Diisobutyl aluminum hydride is prepared and reacted with butadiene in the same manner as described in Example I. Isobutylene and excess butadiene are vented from the organo-aluminum reaction product containing tributenyl aluminum.

Lengthening the hydrocarbon chains is next accomplished by pressuring the autoclave with ethylene to about 1000 p.s.i.g. and heating the reactor to 80–130° C. with stirring. The pressure increases until a temperature of 80–90° C. is reached and then begins to drop. Sufficient ethylene is added over a period of 2 hours to lengthen most of the chains to 8–16 carbon atoms. The reactor is then flushed with nitrogen to remove any unreacted ethylene.

To the organo-aluminum compounds in solution as described above is added an equivalent molar amount of triisobutyl aluminum. The autoclave is heated to 130–150° C. and isobutylene released in the reaction is vented. The temperature is maintained in the range of 130–150° C. until no further release of isobutylene occurs. A polymeric material in which each polymethylene chain is attached to two aluminum atoms in the terminal positions is formed and remains in solution in the decane.

The temperature of the reaction mixture is then lowered to 30–60° C. and dry air is passed into the mixture, causing an exothermic reaction. Rate of addition of the air is regulated so that the temperature does not exceed 60° C. After no further reaction with oxygen occurs, water is added and the mixture is heated to nearly 100° C. to effect hydrolysis. The aluminum hydroxide which forms coagulates as a precipitate and is removed by filtration after the hydrolysis has been completed. The filtrate is then distilled to remove water and decane, and about 110 grams of residue is obtained which is composed of mixed alpha-omega diols mainly having 8-16 carbon atoms per molecule.

While the specific examples herein given show the use of diisobutyl aluminum hydride as the aluminum alkyl reactant, substantially analogous results can be obtained by employing any of the other aluminum compounds conforming to the generic formulas herein given.

We claim:
1. Method of preparing alpha-omega diols which comprises reacting in an inert liquid reaction medium an aluminum compound selected from the groups having the generic formulas

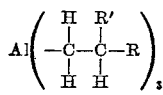

and

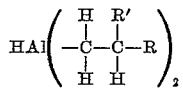

wherein R is an alkyl group having 1-5 carbon atoms and R' is a hydrocarbon group having 1-7 carbon atoms, with butadiene at a temperature in the range of 80 to 150° C. and with a molar ratio of butadiene to said aluminum compound in excess of 3 to 1, thereby to displace hydrocarbon groups from said aluminum compound and form an organo-aluminum compound containing three butenyl groups attached to each aluminum atom, removing the displaced olefinic hydrocarbon from the reaction mixture, contacting the reaction mixture at a temperature in the range of 80-150° C. with an aluminum compound selected from the groups above defined, the molar ratio of such aluminum compound to the aluminum compound initially employed being in the range of 0.8-1.2, contacting the resulting reaction product at a temperature in the range of 60 to 160° C. with ethylene in an amount of at least 3 moles of ethylene per mole of aluminum to lengthen hydrocarbon chains in the reaction product to at least six carbon atoms, reacting the resulting reaction product with oxygen at a temperature of 0-150° C. in amount to insert an oxygen atom between the aluminum atoms and the polymethylene groups attached thereto and reacting the oxygenated product with a member selected from the group consisting of water and acids to form an alpha-omega diol.

2. Method according to claim 1 wherein the molar ratio of aluminum compound used in the second reaction step to that employed in the first reaction step is about 1:1 and the temperature in the oxygen contacting step is 30-60° C.

3. Method according to claim 2 wherein the aluminum compound employed in both reaction steps is diisobutyl aluminum hydride.

4. Method according to claim 1 wherein the aluminum compound employed in both reaction steps is diisobutyl aluminum hydride.

5. Method of preparing an organo-aluminum compound suitable for the preparation of straight chain alpha-omega diols which comprises reacting an aluminum compound selected from the groups having the generic formulas

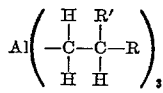

and

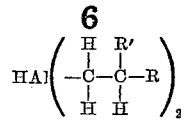

wherein R is an alkyl group having 1-5 carbon atoms and R' is a hydrocarbon group having 1-7 carbon atoms, with 1,3-butadiene to displace the isoalkyl groups and form an organo-aluminum compound containing three butenyl groups attached to each aluminum atom, reacting the product with an aluminum compound selected from the groups above defined to form an organo-aluminum compound having aluminum atoms attached at each end of the tetramethylene chain, and reacting the organo-aluminum compound with ethylene to increase the length of the polymethylene chains to at least six carbon atoms.

6. Method of preparing alpha-omega diols which comprises reacting in an inert liquid reaction medium an aluminum compound selected from the groups having the generic formulas

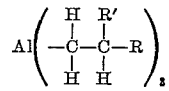

and

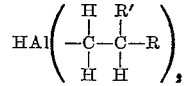

wherein R is an alkyl group having 1-5 carbon atoms and R' is a hydrocarbon group having 1-7 carbon atoms, with butadiene at a temperature in the range of 80-150° C. and with a molar ratio of butadiene to said aluminum compound in excess of 3:1, thereby to displace hydrocarbon groups from said aluminum compound and form an organo-aluminum compound containing three butenyl groups attached to each aluminum atom, removing the displaced olefinic hydrocarbon from the reaction mixture, contacting the reaction mixture at a temperature in the range of 60 to 160° C. with ethylene in amount of at least 3 moles of ethylene per mole of tributenyl aluminum to lengthen hydrocarbon chains in the reaction product to at least six carbon atoms, reacting the trialkenyl aluminum product at a temperature in the range of 80-150° C. with an aluminum compound selected from the groups above defined, the molar ratio of such aluminum compound to the aluminum compound initially employed being in the range of 0.8-1.2, contacting the resulting reaction product with oxygen at a temperature of 0-150° C. in amount to insert an oxygen atom between each aluminum atom and the polymethylene groups attached thereto, and reacting the oxygenated product with a member selected from the group consisting of water and acids to form an alpha-omega diol.

7. Method according to claim 6 wherein the molar ratio of aluminum compound used in the third reaction step to that employed in the first reaction step is about 1:1 and the temperature in the oxygen contacting step is 30-60° C.

8. Method according to claim 7 wherein the aluminum compound employed in both reaction steps is diisobutyl aluminum hydride.

9. Method according to claim 6 wherein the aluminum compound employed in both reaction steps is diisobutyl aluminum hydride.

10. Method of preparing an organo-aluminum compound suitable for the preparation of straight chain alpha-omega diols which comprises reacting an aluminum compound selected from the groups having the generic formulas

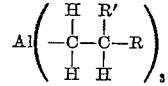

and

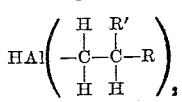

wherein R is an alkyl group having 1–5 carbon atoms and R' is a hydrocarbon group having 1–7 carbon atoms, with 1,3-butadiene to displace the isoalkyl groups and form an organo-aluminum compound containing three butenyl groups attached to each aluminum atom, reacting said organo-aluminum compound with ethylene to increase the length of the alkenyl chains to at least six carbon atoms by addition of ethylene groups between the aluminum atoms and the butenyl groups, and reacting the resulting trialkenyl aluminum with an aluminum compound selected from the groups above defined to displace an isoolefin and form an organo-aluminum compound having aluminum atoms attached at each end of the polymethylene chains corresponding to the lengthened alkenyl chains.

References Cited in the file of this patent
UNITED STATES PATENTS

| | | |
|---|---|---|
| 2,826,598 | Ziegler et al. | Mar. 11, 1958 |
| 2,863,896 | Johnson | Dec. 9, 1958 |
| 2,889,385 | Catterall et al. | June 2, 1959 |
| 2,892,858 | Ziegler | June 30, 1959 |